United States Patent [19]

Schneider

[11] 4,324,062

[45] Apr. 13, 1982

[54] HUMANE INSECT TRAP FOR THE LIVE CAPTURE OF SPIDERS AND THE LIKE

[76] Inventor: Fred A. Schneider, 841 Mohican Way, Redwood City, Calif. 95062

[21] Appl. No.: 122,033

[22] Filed: Feb. 19, 1980

[51] Int. Cl.³ ............................................. A01M 1/10
[52] U.S. Cl. ...................................... 43/110; 43/121
[58] Field of Search ................................. 43/121, 110

[56] References Cited

U.S. PATENT DOCUMENTS

| | | | |
|---|---|---|---|
| 119,337 | 9/1871 | Endslow | 43/110 |
| D. 199,067 | 9/1964 | Laberge | 43/110 |
| 3,494,067 | 2/1970 | Potrzuski | 43/110 |
| 3,713,245 | 1/1973 | Hovey | 43/110 |

Primary Examiner—Jimmy C. Peters
Assistant Examiner—J. T. Zatarga
Attorney, Agent, or Firm—George B. Almeida

[57] ABSTRACT

A mechanically operated trap includes a tubular housing with a movable trap door at either end for trapping an insect therein. One end of the housing is shaped for use in corners, and the other end is flat for use against walls, floors, ceilings, etc. The trap doors are actuated, or actuation is initiated, by various user operated means and are maintained in the closed or open positions by various friction, spring, etc., arrangements. Extension handle means may be included to allow reaching normally-inaccessible insects. The trapped insect may be removed to the outdoors, or otherwise disposed of.

18 Claims, 22 Drawing Figures

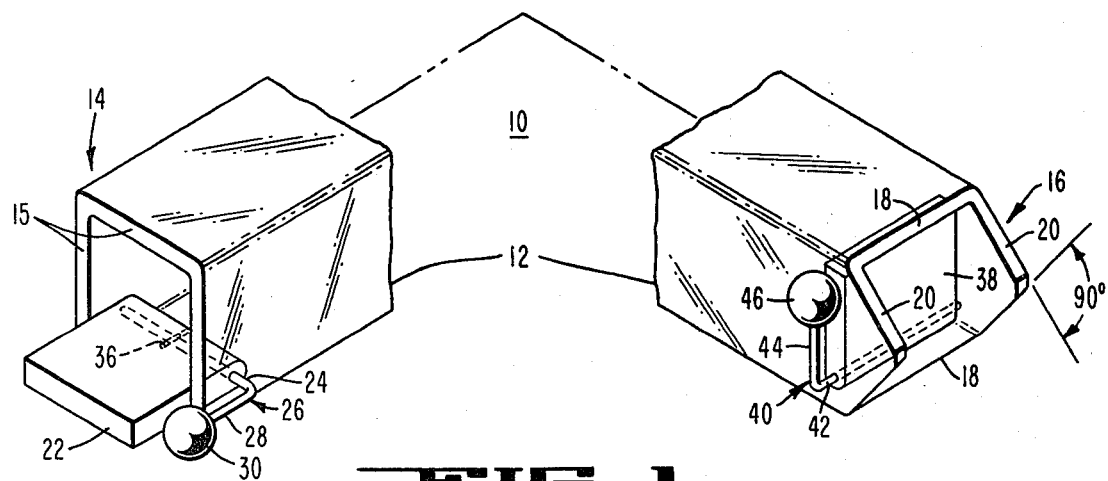
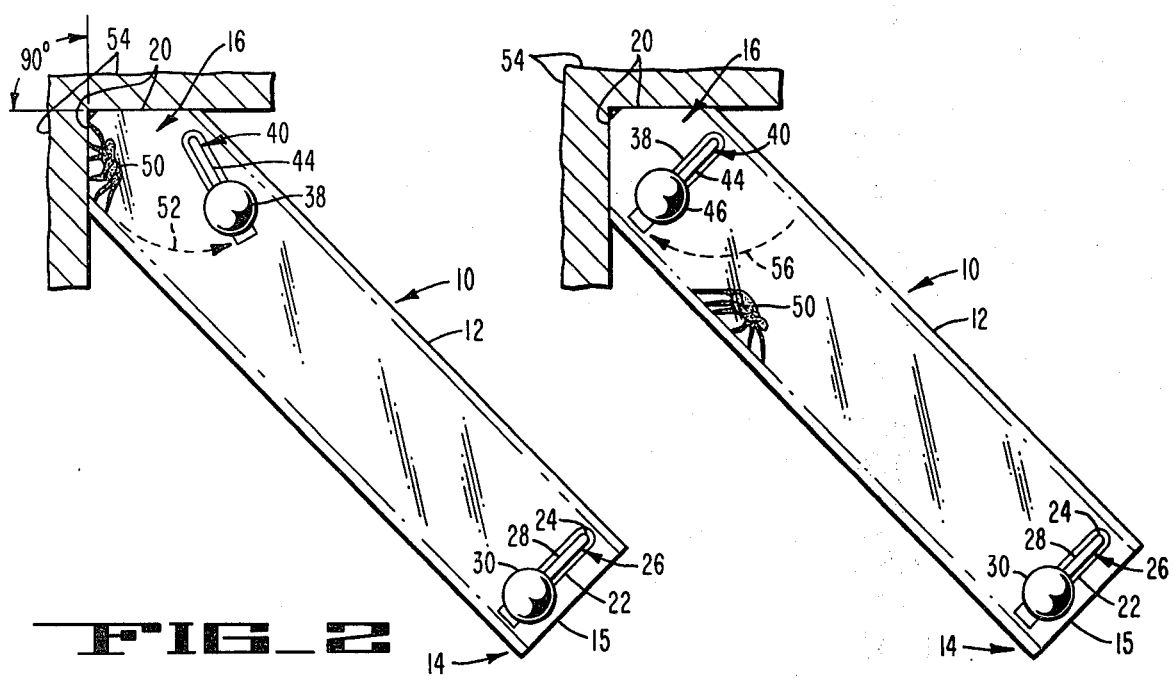
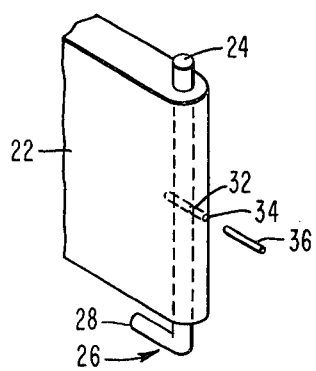
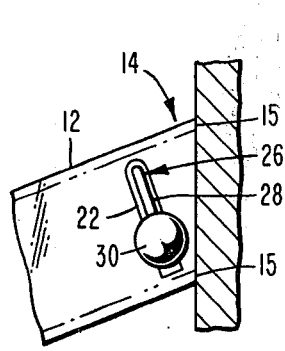

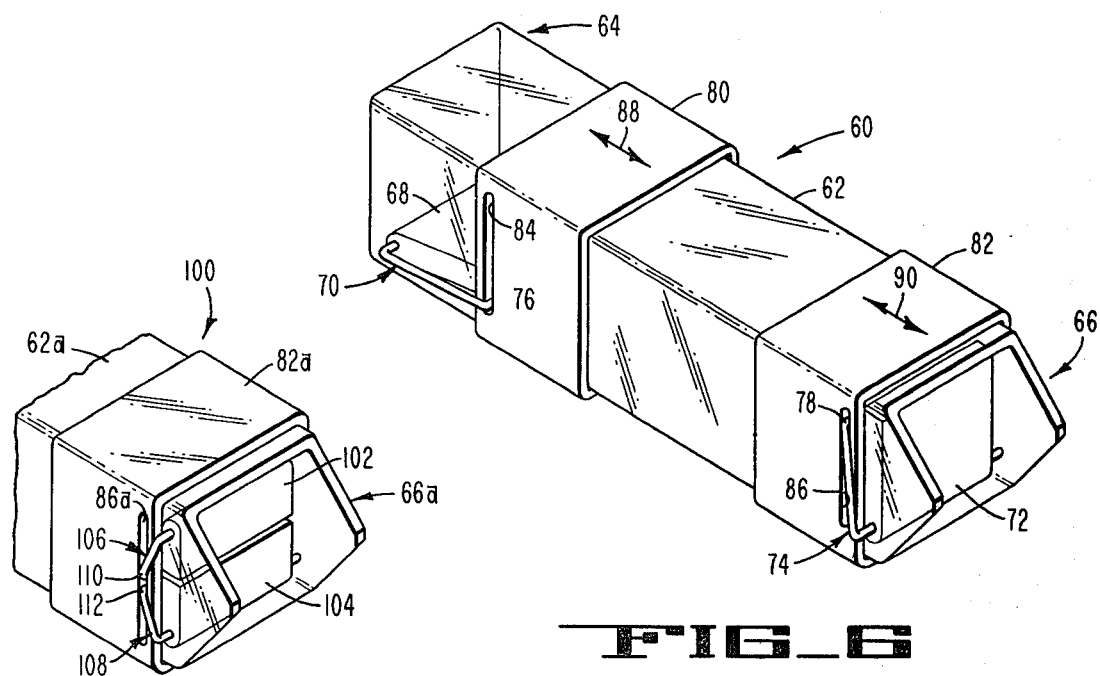
FIG_6
FIG_7
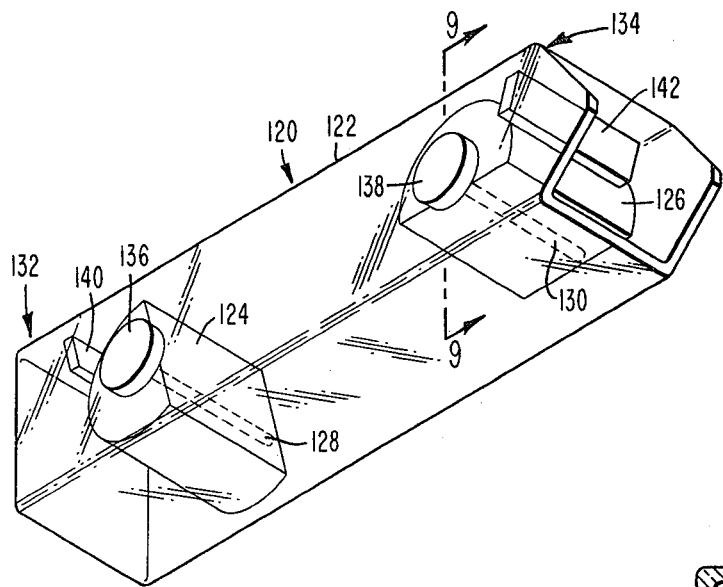
FIG_8
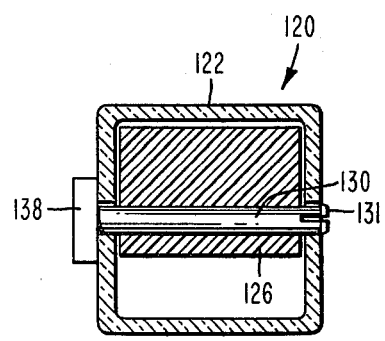
FIG_9

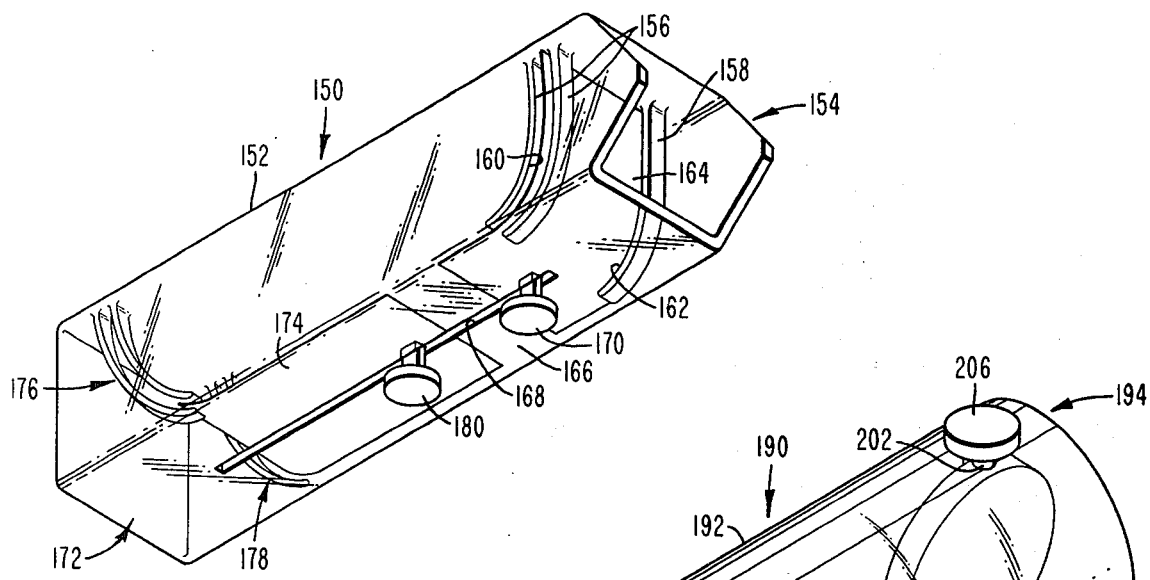
FIG_10
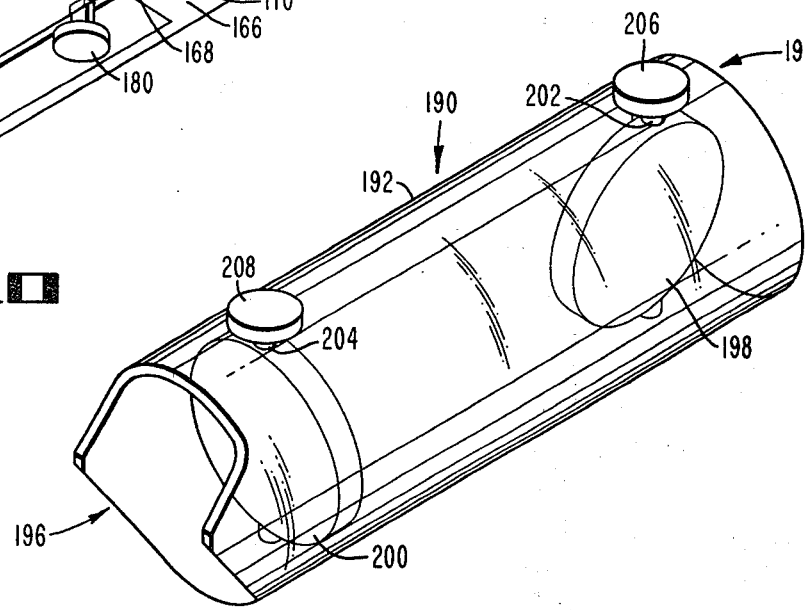
FIG_11
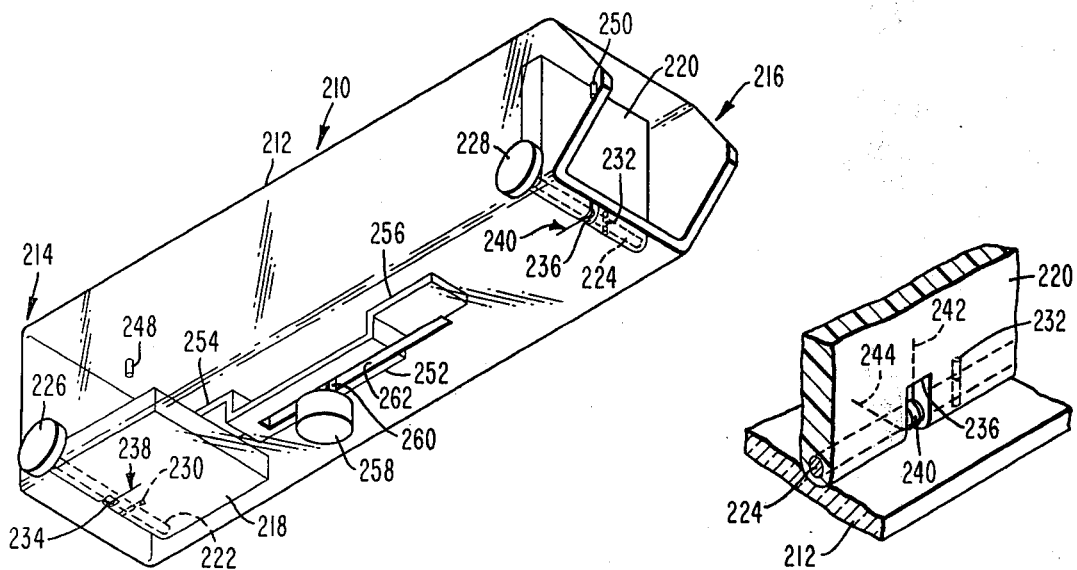
FIG_12    FIG_13

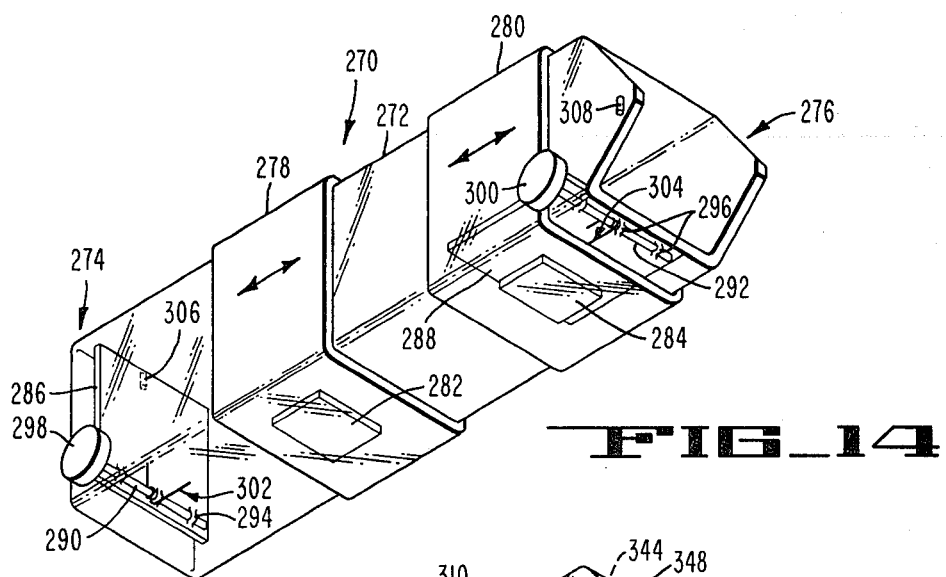
FIG_14
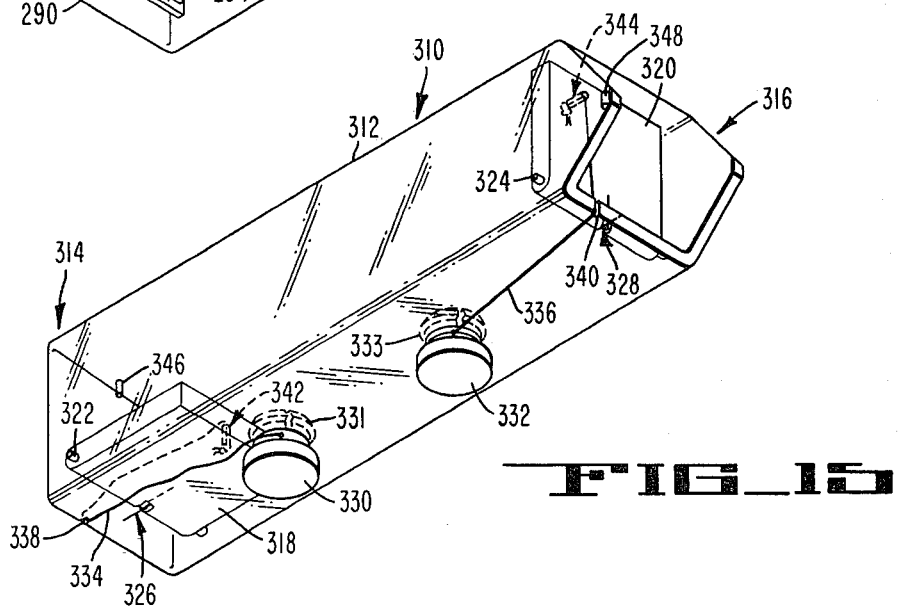
FIG_15
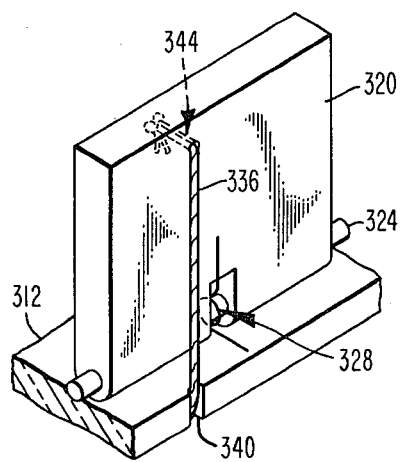
FIG_16

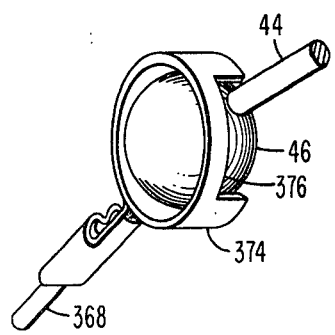
FIG_18
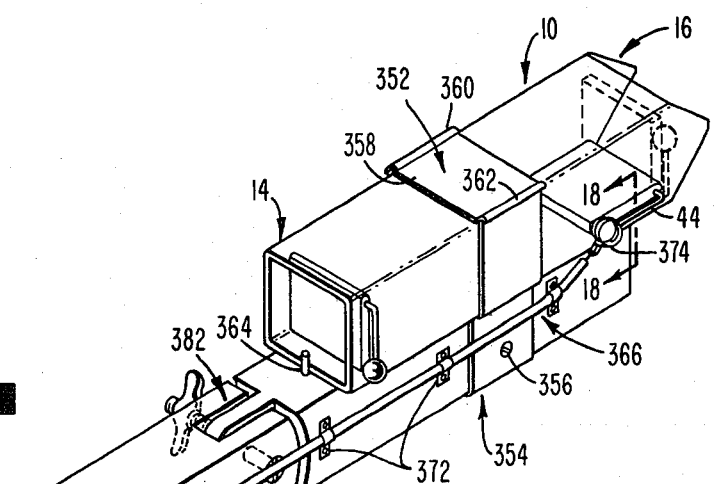
FIG_17
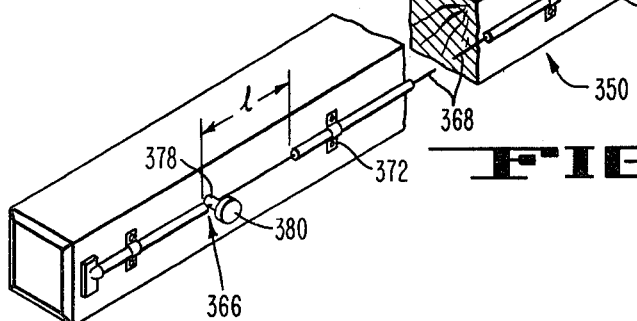
FIG_20
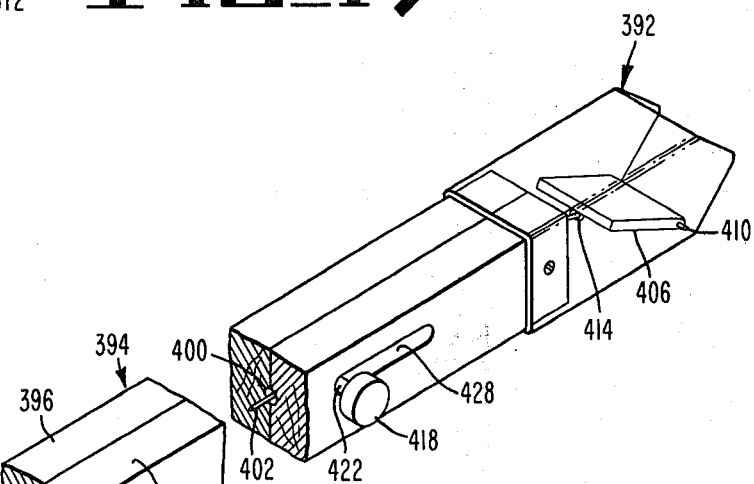
FIG_19
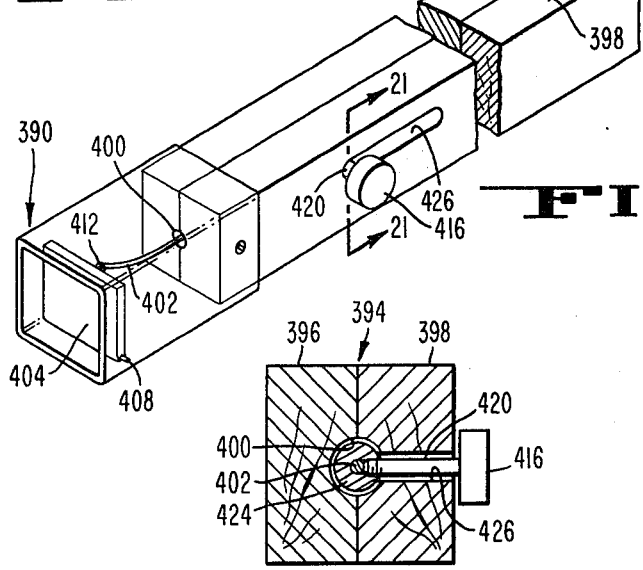
FIG_21
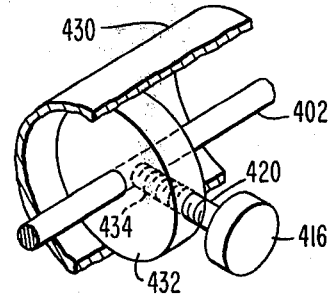
FIG_22

HUMANE INSECT TRAP FOR THE LIVE CAPTURE OF SPIDERS AND THE LIKE

BACKGROUND OF THE INVENTION

The invention relates to insect traps, and particularly to a humane insect trap which is mechanically operable by a user to trap, and thus remove, insects alive.

Insects have always been pests within a household; and countless devices for trapping, poisoning and/or otherwise destroying them have been devised. Most of such devices are concerned with the wholesale liquidation of all insects in a home; those which are readily seen, such as spiders, flies, gnats, mosquitos or other flying or crawling varieties, and those which are generally unseen, such as roaches, termites, earwigs, etc.

However, for the occasional spider, earwig, sow bug, or like crawling insect, the only recourse to their capture and/or their removal from a household is to first kill them by squashing them with a flyswatter, a rolled up newspaper, etc., or by stepping on them if the insect is on the floor, and then removing the remains with a piece of paper, tissue or some implement. Such action generally results in the insect being partially or wholly squashed and thus smeared on the ceiling, wall, floor, window, window blinds, etc. The resulting smear is generally very difficult to clean and many times results in permanently staining the area where the insect was destroyed.

In addition, there are many persons who prefer not to destroy an insect but would rather capture it alive for subsequent disposal in the outdoors. These people are faced with the sometimes unpleasant, and generally unsuccessful, prospect of picking up the insect with their fingers, which could result in a bite or other discomfort, or with some implement which generally results in at least partially maiming the insect.

The only other way of removing such an insect alive is with a small box, such as an old-fashioned matchbox which, however, is not always available around the household.

SUMMARY OF THE INVENTION

The invention provides an inexpensive and convenient device for overcoming the shortcomings of prior art traps and methods for removing insects alive, which readily may be used by anyone to capture an insect safely without having to touch it.

Thus, it is an object of the invention to provide an insect trap for the humane capture and removal of an insect.

It is another object to provide a mechanically actuated trap which may be used to capture an insect on a flat surface or in a corner, without having to touch the insect.

It is a further object of the invention to provide an inexpensive trap wherein the insect can be readily seen as it is trapped and wherein the trap stays closed to allow comfortably transporting the insect to the outdoors, etc., for humane, or otherwise, disposal.

To this end, a tubular housing formed preferably of a transparent plastic, etc., material is shaped at one end to fit into corners and at the other end to fit against a flat surface. A trap door is hinged within each end and is suitably attached to a mechanically actuated handle, knob, etc. The handle or knob is provided with suitable friction, resilient, etc., means which maintains the trap doors open or closed as desired by the user.

BRIEF DESCRIPTION OF THE DRAWINGS

FIG. 1 is a broken-apart perspective of a preferred embodiment depicting one insect trap of the invention combination.

FIGS. 2 and 3 are elevations which illustrate the use of the insect trap in a corner.

FIGS. 4 and 5 depict further details and a modification of the insect trap of FIG. 1.

FIGS. 6 and 7 are perspectives of an alternative embodiment and a modification thereof, respectively, of the invention combination.

FIG. 8 is a perspective of another embodiment of the invention combination.

FIG. 9 is a section taken along line 9—9 of FIG. 8.

FIGS. 10, 11, 12, 14 and 15 are perspectives of still further embodiments of the invention combination.

FIGS. 13 and 16 are broken-out perspectives of portions of FIGS. 12 and 15, respectively.

FIGS. 17 and 19 are perspectives of further embodiments of the invention combination with integral extension handles.

FIG. 18 is a broken-out perspective of a portion of FIG. 17.

FIGS. 20 and 22 are broken-out views of details, and an alternate embodiment, respectively, of the embodiment of FIG. 19.

FIG. 21 is a section taken along section line 21—21 of FIG. 19.

DESCRIPTION OF THE PREFERRED EMBODIMENTS

The following figures and descriptions thereof depict various embodiments for implementing the combination of the invention. Thus, several embodiments include user-actuated mechanical trap door means wherein the trap door is closed and/or opened by a closure force generated by the user. Other embodiments include user initiated mechanical trap door means wherein trap door closure is instigated by the user, and closure is provided by suitable resilient means, e.g., spring means. In some embodiments, the closure force may be generated by the user and the opening force may be generated by the resilient means, and vice versa. In all embodiments, means (generally friction) are provided to maintain the trap doors in selected closed or open positions.

To this end, FIGS. 1-4 depict a first embodiment of the insect trap employing a user-actuated mechanical trap door means. FIG. 1 is a perspective of the opposite ends of a trap 10 for capturing spiders, bugs, and other insects alive for removal and subsequent disposal. The insect thus may be turned loose outdoors alive and unharmed or may be otherwise disposed of without marring the walls in the home, and without having to handle the insect with newspaper, tissues, etc. FIGS. 2 and 3 depict the trap 10 in use against a corner of a room. FIG. 4 exemplifies further details of the trap door, notably, one means of securing same for pivotal movement within the trap. All the various embodiments of the subsequent FIGURES also may be similarly used.

More particularly, the trap 10 includes a tubular hollow member or housing 12, formed preferably of a transparent plastic material. The housing 12 is preferably square in cross-section but also may be rectangular or circular as depicted below. One end 14 is formed substantially perpendicular to the length of the housing, i.e., is formed to define flat end surfaces 15 which lie along a common plane. The flat end surfaces also may be formed along a plane which lies at a selected angle to the length of the housing 12, such as depicted in FIG. 5, whereby entrance of an insect is facilitated due to the downward sloping interior of the housing 12.

The opposite (pointed) end 16 of the trap 10 includes two wall end surfaces 18 which are flat (i.e., perpendicular to the length of the housing 12 as in the end 14) and whose alternate (pointed) wall ends 20 are formed to define matching, i.e., identical, points forming a substantially 90 degree angle. The end surfaces 18, 20 thus define the pointed end 16 of the trap 10, which fits snuggly into a corner of the walls of a room.

Flat end 14 has a trap door 22 of selected shape and dimensions to fit snuggly, but movably, within the confining inner surfaces of the housing 12. The trap door 22 pivots about a pivot shaft 24, which is formed of a door handle pin 26 bent at right angles, wherein an extension of the pin 26 provide a door handle 28. The latter allows the user of the trap 10 to open and close the trap door 22, by applying an actuating force to the handle 28 to pivot the door about the pivot shaft 24 of the door handle pin 26. A plastic, hard rubber, wood, etc., ball 30 is pressed, glue, or otherwise secured to the end of the handle 28 and is of such size which allows the adjacent ball circumference to rub firmly against the outer surface of the housing 12 throughout an arcuate movement of 90 degrees corresponding to the opening and closing of the trap door 22.

As shown in detail in FIG. 4 with reference to flat end 14, the door handle pin 26, and particularly the pivot shaft 24 thereof, is secured to the door 22 by drilling a very small hole 32 transversely through the pivot shaft 24, and a matching hole 34 into the respective end of the door 22 in register with the hole 32. A key pin 36 is pressed into the hole 34 and through the hole 32 in the pivot shaft 24 to positively secure the door handle pin 26 to the trap door 22 in parallel relation to a plane through the door, while providing proper spacing between the handle 28 and the outer surface of the housing 12 to maintain the spring action of the ball 30/handle 28 against the housing surface.

The door handle pin 26 thus provides several functions, i.e., it forms the pivot shaft 24, the handle 28 to allow actuating the door, securing means for positively locating the trap door 22 within the confining walls of the housing 12 with a selected parallel orientation relative to the door, and (in conjunction with the ball 30) friction means for holding the trap door closed (or open) due to the friction between the ball 30 and the adjacent outer wall of the housing 12.

The pointed end 16 likewise includes a trap door 38, a door handle pin 40 forming a pivot shaft 42 and a door handle 44, and a ball 46 pressed onto the handle 44. The trap door 38 is secured to the pivot shaft 42 via a key pin 48. Thus, the trap door configuration of the pointed end 16 is identical to that of the flat end 14.

Although the FIGS. 1-3 depict the trap 10 with the pivot shafts 24, 42 disposed near the same wall of the housing 12, the door handle pins may be located at opposite walls of the housing, whereby the doors 22, 38 pivot from opposite walls (see, for example, FIG. 17, infra).

The flat end 14 of the insect trap 10 is used to capture alive spiders, bugs, etc., which are found on a flat surface, e.g., a wall, ceiling, floor, etc. The opposite pointed end 16 of the trap is used to capture insects which are found in the corners of walls, ceilings, etc. The latter pointed end fits snuggly into the corner to completely surround the insect whereby the only avenue of "escape" is into the trap housing 12.

FIGS. 2, 3 illustrate the use of the trap 10 when capturing a spider 50 found in a corner, using the pointed end 16 of the trap. The trap door 38 thereof first is fully opened inwardly, as shown via dashed arrow 52 in FIG. 2. The pointed end 16 is then quickly placed over the spider 50, with the pointed wall ends 20 fitted into the corner of the walls 54, such that the spider's only escape is into the interior of the housing 12. A few taps on the trap 10 with a finger, etc., generally scares the spider into the trap. Once the spider has moved past the trap door 38, the door 38 is closed, as shown by dashed arrow 56 of FIG. 3 to trap the spider inside for subsequent disposal unharmed outdoors, etc.

The flat end 14 of the trap 10 is used in a similar manner against a flat wall.

FIG. 6 depicts an alternative embodiment of an insect trap 60 employing a user-actuated mechanical trap door means. A housing 62 includes flat and pointed ends 64, 66, respectively, wherein flat end 64 has a trap door 68 which pivots about a pivot shaft of a door handle pin 70. Pointed end 66 has a trap door 72 which pivots about a pivot shaft of a door handle pin 74. The housing 62, ends 64, 66, doors 68, 72 and the handle pins 70, 74 are essentially similar to their counterparts of the trap 10 of FIGS. 1-4, and may be assembled in similar fashion. However, door handle pins 70, 74 are modified to exclude the balls (30, 46) of FIGS. 1-4, and the handle ends of the pins 70, 74 of FIG. 6 are bent at right angles back towards the outer surface of the housing 62 to define handle tips 76, 78 which extend parallel to the pivot shafts of the respective handle pins 70, 74. A pair of identical trap door actuating slides 80, 82, formed of material similar to that of the housing 62, are snuggly, but slidably, disposed over ends 64, 66, respectively. Slides 80, 82 have slots 84, 86 respectively formed within one side wall thereof, which slots have a width which is slightly larger than the diameter of the door handle pins 70, 74. The handle tips 76, 78 are placed into respective slots 84, 86, whereby reciprocal translation of the slides 80, 82 as shown by arrows 88, 90, causes the handle tips 76, 78 and thus the door handle pins 70, 74 to pivot about an arc approaching 90 degrees to thus open and close the respective trap doors 68, 72. The friction between the snug slides and the housing provides friction means for holding the trap doors in the closed, open, partly open, etc., positions. Friction means also may be provided by extending the length of the small handle tips 76, 78 and rounding the ends thereof, whereby the pressure of the rounded ends against the outer surface of the housing 62 also provides friction means due to the resilience of the handle of the door handle pins 70, 74.

FIG. 7 depicts the pointed end 66a of an insect trap 100 wherein the trap door means thereof is a modification of the trap door means of FIG. 6. Thus, a slide 82a is disposed about the pointed end 66a of a housing 62a and includes a slot 86a. The single trap door 72 of FIG. 6 is replaced by a pair of trap doors 102, 104 which pivot about the pivot shafts of a pair of respective door handle pins 106, 108 at opposite sides of the housing. The handle ends of the latter pins 106, 108 are bent (as in FIG. 6) to define handle tips 110, 112, which are placed in the slot 86a to provide simultaneous pivoting of the trap doors 102, 104 upon translation of the slide 82a.

FIG. 8 depicts a further embodiment 120 of an insect trap, with an alternate user-actuated, mechanical trap door means in combination with a housing 122 similar to housings 12 and 62 of previous mention. Thus, the trap door means is formed of truncated (cylindrical) spools 124, 126 disposed for rotation about central shafts 128, 130, which span the housing 122, at a selected distance from respective flat and pointed ends 132, 134. The truncated spools 124, 126 are slightly larger than half cylinders whereby they may be rotated symmetrically about their shafts 128, 130 via respective knobs 136, 138 secured to, or integral with, the shafts 128, 130. The shafts 128, 130 are pressed into respective bores in the spools 124, 126 (FIG. 9) and the tips thereof are slotted and flared as at 131 of FIG. 9 to secure the shafts 128, 130 in position across the housing 122. A pair of fixed barriers 140, 142 are secured across the width of the housing, between the spools and the respective ends of the housing, to prevent an insect from seeking refuge in the corner formed by the wall of the housing and the curvature of the spool when the latter is in the open position. Thus, when the trap door spool 126 (or 124) is in the position shown in the FIG. 8, the respective end of the trap 120 is open and an insect may pass into the interior of the housing 122. The trap is then closed (as depicted by spool 124 at the flat end 132) by rotating the respective integral knob to span the opening of the respective end of the housing with the full diameter of the respective spool in the manner depicted by the spool 124 in FIG. 8.

FIG. 10 depicts another embodiment 150 of an insect trap, employing an alternate, user-actuated, mechanical trap door means in conjunction with a modified housing 152. As shown at the pointed end 154 of the housing 152, opposing pairs of generally arcuate ridges 156, 158 are formed in the inner surfaces of the housing 152, thereby forming corresponding arcuate trap door guides or slots 160, 162. A thin, flexible, metal or plastic strip defining a trap door 164 is slidably disposed within the opposing slots 160, 162 and extends a given length into the inner portion of the housing 152 along one wall 166 thereof. A slot 168 is formed centrally along a length of the wall 166, whereby a knob 170 includes an integral stub which extends through the wall and is secured to the extension of the trap door strip 164. Thus, reciprocal translation of the knob 170 along the slot 168 alternately opens and closes the trap door strip 164.

The slots 160, 162 may be formed within the sidewalls of the housing 152, wherein, however, the slots must then extend into the region along the wall 166 in order to accommodate the width of the trap door strip 164. Also, slot 168 should be as narrow as possible to prevent the escape therethrough of smaller insects.

The trap door means of the flat end 172 of the trap 150 is identical to that of the pointed end 154 and includes, inter alia, a flexible trap door strip 174, opposing guide ridges and slots 176, 178, and a knob 180 secured to the extended end of strip 174 via the slot 168.

FIG. 11 depicts still another embodiment 190 of the insect trap, employing an alternate, user-actuated, mechanical trap door means in conjunction with a modified housing 192. The housing is shown formed of a cylindrical rather than a rectangular member such as in the previous embodiment, but only to illustrate that various housing geometries may be used in the various embodiments described herein. Cylindrical housing 192 includes flat and pointed ends 194, 196. Circular trap door discs 198, 200 of a diameter slightly less than the inside diameter of the housing 192 are rotatably mounted within respective ends 194, 196, on integral shafts 202, 204. Knobs 206, 208 are formed integral with the shafts 202, 204, or are otherwise suitably secured to the discs 198, 200, to allow the user to selectively rotate same within the housing 192. Friction between the shafts/knobs and the housing provide the friction means to maintain the trap door discs 198, 200 in the open or closed positions. The shafts 202, 204/knobs 206, 208 may be formed and inserted through the door discs 198, 200 and housing 192 in the manner shown in FIG. 9.

FIGS. 12-15 depicted still further embodiments of insect traps employing various user-initiated trap door means but wherein the trap doors are actuated via various resilient means, such as springs, etc. To this end, FIG. 12 depicts an insect trap 210 which includes a housing 212 with flat and pointed ends 214, 216 within which are pivotally mounted trap doors 218, 220, respectively. The door handle pins of, for example, FIGS. 1-7, are replaced with straight pivot shafts 222, 224 in respective trap doors 218, 220, and knobs 226, 228 are secured to the ends of the pivot shafts 222, 224. The shafts are pinned to the trap doors as shown, for example, in FIGS. 1, 3 and 13, via key pins 230, 232, respectively. Narrow slots 234, 236 are cut in the base of the doors 218, 220 to expose the pivot shafts 222, 224, respectively, wherein springs 238, 240 are installed during assembly of the trap 210. The springs are configured to continuously apply a closing force to their respective trap doors 218, 220; ergo, springs 238, 240 are secured by the pivot shafts 222, 224, with their ends bearing against the inside surfaces of the respective trap door and the adjacent wall of the housing 212. Thus, FIGS. 12 and 13 show the spring 240 disposed in slot 236 with an end 242 thereof bearing against the inside surface of the trap 220, and with an end 244 bearing against the adjacent wall of the housing 212. The spring 238 arrangement on the flat end 214 is of similar design. It is to be understood that other configurations of springs, resilient plastic extensions from the doors, etc., may be used to provide the resilient means for maintaining the trap doors in a normally closed position. Stops 248, 250, comprised of pins pressed through the wall of the housing 212, are positioned to locate the doors 218, 220 in respective closed positions.

The doors 218, 220 are alternately held in the open position via a locking slide clip 252 with door engaging tips 254, 256. The tips slide over the ends of respective doors 218, 220 in response to translation by the user of a knob 258 which is rigidly secured to the slide clip 252 via a flat stub 260. The stub 260 snuggly translates within a slot 262 in the wall of the housing 212, and prevents the slide clip 252 from twisting or rotating within the housing. The doors are placed in the open position by rotating the desired knob 226 or 228 to rotate the respective door 218 or 220 to the fully open position. The respective tip 254 or 256 of the slide clip is then slid over the end of the door, as shown by door 218, tip 254 at the flat end 214 in FIG. 12.

Although a single slide clip 252/knob 258 is shown in FIG. 12, wherein only one door is held open at one time, a pair of separate slides, each with a knob, may be employed whereby both doors may be independently opened or closed.

FIG. 14 depicts another embodiment of an insect trap 270 which includes user-initiated trap door means and spring-actuated trap doors, wherein the trap doors are held open via magnetic means. Thus, trap 270 includes a housing 272 with flat and pointed ends 274, 276, and a pair of reciprocating slides 278, 280 disposed snuggly thereabout in the manner of the trap 60 in FIG. 6. Slides 278, 280 have small permanent magnets 282, 284, respectively, imbedded in one wall thereof adjacent the corresponding wall of the housing 272 against which the doors open. Trap doors 286, 288 are pivotally disposed in the flat and pointed ends 274, 276, respectively, of housing 272, on pivot shafts 290, 292. The trap doors 286, 288 are formed of a metallic material and are punched at the pivot edge thereof to provide a respective series of tabs 294, 296. Pivot shafts 290, 292 are pressed through the series of tabs 294, 296 to tightly secure the metallic doors 286, 288 thereto for rotation thereby. Knobs 298, 300 are formed with, or are secured to, the pivot shafts 290, 292, to allow the user to rotate the doors to the open position. Magnets 282, 284 then hold the doors open when the slides 278, 280 are at their extreme outer positions at the ends of the housing 272. Springs 302, 304 are threaded onto pivot shafts 290, 292 with their ends bearing against the inner surfaces of the respective doors and the corresponding wall of the housing. Either door is released by sliding the respective slide 278, 280 towards the center of the housing 272, whereby the magnet slides away from the metallic door to allow the respective spring to close same, as depicted by slide 278/door 286. Stop pins 306, 308 determine the closed position of the doors 286, 288.

FIG. 15 depicts a further embodiment of an insect trap 310 which includes user-actuated closing means and resilient means for holding the trap doors open. To this end, trap 310 includes a housing 312 with flat and pointed ends 314, 316. Trap doors 318, 320 are formed of plastic material and pivot on pivot shafts 322, 324, respectively, which may be secured to the doors via key pins (not shown) as previously described. Springs 326, 328 are slid onto respective pivot shafts 322, 324 and are disposed to hold doors 318, 320 in the open, rather than in the closed, position, as shown in detail in FIG. 16. The doors are opened by rotating respective knobs 330, 332 mounted in the wall of housing 312, wherein the respective shafts of each knob are slotted and flared as at 331, 333, respectively, to rotatably secure them to the housing 312. (See, for example, FIG. 9). Flexible strings 334, 336 are secured to respective shafts (or hubs) of the knobs 330, 332, respectively, and extend through grooves 338, 340 to secure to the ends of the doors 318, 320 via respective holes, eyelets, etc., as indicated at 342, 344. Rotation of either knob 330, 332 wraps the respective string 334, 336 about the circumference of the shafts or hubs to pull the door closed. Friction of the plastic knobs with the housing wall overcomes the force of the springs to hold the respective door in the closed position against respective pin stops 346, 348. The trap doors 318, 320 are opened by rotating the knob 330, 332 in the opposite direction to unwind the strings.

FIGS. 17 and 19 depict two embodiments of extension means in integral combination with the insect trap concepts of the invention, whereby the trap may be used to reach insects which are otherwise out of reach of the user. The embodiment of FIG. 17 is designed for use with a slightly modified insect trap 10 of FIGS. 1–4, while the embodiment of FIG. 19 is an integral trap/extension combination. The trap 10 is modified to provide handles 26, 40 and thus doors 22, 38 which pivot at opposite walls of the housing 12, to allow use of either end of the trap 10 with the extension means.

Referring to FIGS. 17 and 18, an extension handle 350 is formed of a selected solid length of suitable lightweight material, e.g., wood, plastic, etc. The insect trap 10 of FIGS. 1–4 is demountably secured to the end of handle 350 via clamp means 352, herein depicted as a strap 354 of resilient metal material formed about the handle 350 and secured thereto via screws 356. The ends of the strap are formed to receive the housing 12. A clasp 358 is hinged at one end to the respective end of the strap, as at 360, and clips at its other end 362 to the other end of the strap 354. The trap 10 is pre-positioned on the handle 350 by means of a position pin 364. Obviously, mounting means other than clasp means 352 may be used to demountably secure the trap 10 to the handle 350.

An extension door actuating means 366 is suitably secured along one side of the handle 350 and includes a translatable spring steel wire or cable 368 extending within a stationary cable sheath 370. Thus, the cable 368/sheath 370 is similar in structure and materials to a choke or throttle control cable means commonly used in the engine industry. The sheath 370 is secured to the handle 350 via small brackets and brads, as indicated at 372, or by any other means, such as staples, glue, etc. The extended end of the cable 368 is clamped, spot soldered, etc., to a handle ring 374. The latter fits over the ball 46 of the pointed end 16 of the insect trap 10. A 90 degree arcuate portion 376 is cut out of the ring 374 to allow the ball 46 to rotate 90 degrees within the ring upon full translation of the cable 368 corresponding to the pivoting of the trap door 38 from the closed to the open positions, and vice versa. The ring 374 is held over the ball 46 via the spring tension in the cable 368 but is readily disassembled to allow reversing the ends of the trap 10 on the handle 350. To this end, the ring 374 is lifted from the ball 46, the clasp 358 is unclipped at 362 and is swung back to allow the trap 10 to be removed. The trap is then reversed in orientation, replaced within the clamp means 352 with the trap positioned against the position pin 364, and the clasp 358 is snapped back at 362 to secure the trap 10 with the flat end 14 protruding.

A length, l, of the cable sheath 370 is removed at the user's end of the handle 350 to expose the cable 368, wherein the ends of the sheath act as stops for the open and closed positions of the door. A small internally threaded sleeve 378 has a small transverse hole therein, through which passes the cable 368, and a threaded extension of a knob 380 is threaded into the sleeve 376 with the end of the extension tightened against the cable 368 to positively secure the knob 380 to the cable. The knob 380 is positioned on cable 368 such that when the knob is slid fully back the length l, the trap door is opened and, when slid fully forward, the trap door is closed. Thus, length l is equal to the distance the ring 374 travels to pivot the respective trap door through a 90 degree arc with either the flat or pointed end of the trap 10 protruding.

To facilitate the angular orientation of the insect trap 10 against a wall or corner, means may be provided as shown at 382, to bend the handle 350. By way of example, the means 382 may comprise a hinge/bolt and wing nut as depicted or may comprise any other stiff, but flexible, coupling disposed within the trap end of the handle 350.

FIG. 19 depicts an integral trap/extension means combination where an insect trap is divided with flat and pointed ends 390, 392 integrally secured to the opposite ends of an extension handle 394 formed, for example, of wood, aluminum or plastic tubing, etc. The handle is formed of two similar members 396, 398, and includes a groove along the center of one or both members the full length thereof. Upon assembly, the groove defines a passageway 400 for reciprocal translation therein of a control cable 402.

The flat and pointed ends 390, 392 include respective trap doors 404, 406 which rotate about pivot shafts 408, 410. The ends of the cable 402 are pivotally secured to the opposite ends of the doors, for example, via eyelets 412, 414 (see also FIG. 20), and the cable length is such that door 404 is open when door 406 is closed. As further shown in FIG. 21, the cable 402 is actuated via a pair of knobs 416, 418 which include respective setscrew portions 420, 422 integral therewith which are threaded at their ends. A pair of hollow sleeves (depicted by sleeve 424 of FIG. 21) are slid over the cable 402 and positioned in register with the knobs 416, 418, respectively. The sleeves have threaded radial bores in the sides thereof to allow respective setscrew portions 420, 422 to thread therein to secure the knobs 416, 418 to the cable 402. The setscrew portions 420, 422 are introduced through the handle piece 398 via respective slots 426, 428 therein. The extremes of the latter slots provide stops to limit the translation of the setscrew portions and thus of the cable 402, to thereby determine the open and closed positions of the trap doors 400, 406.

Means for bending the handle 394, similar to means 382 of FIG. 17 may be provided at one or both ends of the handle 394, to facilitate orienting the ends 390, 392 of the insect trap of FIG. 19 against a wall, corner, etc. Further, the solid wood handle depicted in FIG. 19 may be replaced by a metal, plastic, etc., length of tubing 430, such as depicted in FIG. 22. In such embodiment, a circular disc 432 may replace the sleeve 424 of FIG. 21, and the setscrew portion 420 of the knob 416 is threaded along most of its length. The disc 432 includes a threaded radial bore 434 for receiving the setscrew portion 420, whereby the end of the latter is tightened against the cable 402 to secure the knob 416 thereto. The disc 432 further provides a guiding spacer for the cable 402 to facilitate translation thereof through the tubing 430.

As may be seen from the various embodiments of the FIGS. 1–22, many alternative configurations and modifications are contemplated within the basic concepts of the insect trap of description herein.

I claim:

1. A hand-held trap apparatus for capturing insects alive from given surfaces to allow their subsequent disposal, comprising;
    tubular housing means terminating at its ends in preselected flat and pointed geometry configurations for fitting against flat and corner surfaces respectively to totally enclose the insect within the end;
    mechanically actuated trap door means including a trap door having integral closure and open actuating means formed of mechanical element means coupled to the trap door, and disposed within the flat and pointed ends to close and open respectively the end of the housing means in response to the mechanical application of respective closing and opening forces; and
    means for maintaining the trap door means in the opened or closed positions;
    wherein the captured insect is safely contained within the trap apparatus for subsequent disposal.

2. The apparatus of claim 1 wherein:
    the tubular housing means is a hollow rectangle formed of a transparent plastic material; and
    the trap door means include a slidable trap door confined within track means which slidably guide the trap door across the end of the housing means.

3. The apparatus of claim 2 wherein:
    the trap door is formed of a thin flexible sheet:
    the track means include matching opposing track slots formed in the inside surfaces and extending arcuately within the across the end of the housing means for slidably receiving a respective flexible sheet; and
    the mechanical element means includes a central slot along one wall of the housing means, and a knob secured to the flexible sheet and extending through the slot, wherein translation of the knob alternately opens and closes the sheet.

4. The apparatus of claim 1 wherein;
    the tubular housing means is formed of a transparent plastic material; and
    the trap door means include means for selectively pivoting the trap doors within either end of the housing means.

5. The apparatus of claim 4 wherein;
    the means for pivoting includes a door handle pin including a pivot shaft disposed through the housing means and secured to the trap door, and a door handle integral with the pivot shaft substantially at right angles thereto;
    said means for maintaining including a ball secured to the end of the door handle and disposed to bear against the adjacent surface of the housing means to create friction therewith.

6. The apparatus of claim 5 wherein;
    the pivot shaft is secured to the trap door via a key pin which extends through the pivot shaft and the door material.

7. The apparatus of claim 4 wherein;
    the means for pivoting comprises a door handle pin including a pivot shaft disposed through the housing means and secured to the trap door, a door handle integral with the pivot shaft substantially at right angles thereto, and a handle tip integral with the door handle substantially at right angles thereto and extending back towards the housing means; and
    said means for maintaining being integral with the means for pivoting and comprising a respective slide disposed snuggly but slidably about each end portion of the housing means, each slide having a slot therein substantially transverse to the housing means length for receiving therein a respective handle tip;
    wherein translation of either slide towards the middle of the housing means pivots the door handle to open the respective door, and vice versa.

8. The apparatus of claim 7 further including;
    a pair of trap doors disposed within each end of the housing means and pivoted at opposite sides thereof;
    a respective pair of door handle pins, each with pivot shafts, door handles and handle tips for slidably engaging respective transverse slots in respective slides.

9. The apparatus of claim 4 wherein;
the trap doors each define a spool truncated along its length and rotatable about its center within respective ends of the housing means;
said mechanical element means includes a knob, with a shaft extending therefrom through the axis of the respective truncated spool door, whereby rotation of the knob alternately opens and closes the spool doors; and
wherein the means for maintaining comprises the friction existing between the knob/shaft and the housing means.

10. The apparatus of claim 4 further including;
trap doors formed of pivotable members of a geometry matching the inside geometry of the housing means;
pivot shafts secured through the axes of the pivotable members and spanning the housing means; and
knobs secured to the pivot shafts for imparting rotation to the pivotable members to alternately open and close the respective ends of the housing means.

11. The apparatus of claim 1 wherein the actuating means includes resilient means mechanically coupled to the trap door to apply the actuating force in response to the user.

12. The apparatus of claim 11 further including;
pivot shafts secured through one end of the respective trap doors and spanning the housing means at either end thereof;
a pair of knob/hub means disposed in a side wall of the housing means for rotation with respect thereto;
flexible string means secured to respective knob/hub means and extending therefrom to secure to the ends of respective trap doors opposite the pivoted ends; and
spring means coupled to each door to urge same to the open position;
wherein given rotation of the knobs/hubs takes up the string means and closes the respective door against the spring means, and vice versa.

13. The apparatus of claim 11 further including;
the trap doors formed of a metallic material;
pivot shafts secured along one edge of respective metallic doors, and a knob secured to each pivot shaft for imparting an opening force to pivot open the respective door;
a pair of slides, each slidably and snuggly disposed about respective end portions of the housing means;
a permanent magnet disposed within a wall of each slide to magnetically attract and hold a respective metallic door in the open position; and
spring means coupled to each metallic door to urge the door to the closed position upon release of the magnetic force of the slidable slide and magnet.

14. The apparatus of claim 11 further including;
pivot shafts secured through an end of the respective trap doors and spanning the housing means, and a knob secured to each pivot shaft to allow an opening force to pivot open the respective door;
a central slot disposed along one wall of the housing means;
a knob disposed to extend through the slot and into the housing means;
a slide clip with door engaging tips selectively secured to the extended end of the knob for slidable translation along the slot within the housing means;
wherein a door engaging tip maintains one trap door in the open position, while the opposite tip releases the opposite door; and
spring means coupled to each door to urge same to the closed position upon release of the respective door by its door engaging tip.

15. The apparatus of claim 1 further including;
extension handle means operatively secured to the housing means;
extension door actuating means integral with the extension handle means for reciprocal translation by the user with respect to the handle means;
attachment means coupling the extension door actuating means to the open and closure actuating means.

16. The apparatus of claim 15 further including;
demountable clamp means for selectively securing the housing means to the extension handle means;
cable means defining the extension door actuating means and including a knob secured at one end of the cable means to impart the translation by the user thereto; and
the attachment means is integral to the end of the cable means and is coupled to the door handle to impart rotation to the trap door in response to the translation.

17. The apparatus of claim 16 further including;
means integral with the extension handle means for selectively bending the end of the extension handle means which holds the trap at a selected angle;
stop means for locating the position of the housing means on the extension handle means; and
said trap doors are pivoted at opposite sides of the housing means.

18. The apparatus of claim 15 further including;
said extension handle means having a centrally extending passageway therethrough;
said tubular housing means being disposed in two halves and integrally secured at either end of the extension handle means;
cable means defining the extension door actuating means extending through the passageway and including a knob secured at either end portion of the cable means, said knobs extending transversely through the extension handle means for translation therealong a selected length; and
the attachment means are integral with each end of the cable means and coupled to the trap door means to impart rotation to the latter in response to the translation.

* * * * *